(12) United States Patent
Waibel et al.

(10) Patent No.: US 7,934,575 B2
(45) Date of Patent: May 3, 2011

(54) ROBOTIC LOCOMOTION METHOD AND MOBILE ROBOT

(76) Inventors: Markus Waibel, Chavannes (CH); Peter Duerr, Lausanne (CH)

( * ) Notice: Subject to any disclaimer, the term of this patent is extended or adjusted under 35 U.S.C. 154(b) by 140 days.

(21) Appl. No.: 12/339,928

(22) Filed: Dec. 19, 2008

(65) Prior Publication Data

US 2009/0166102 A1 Jul. 2, 2009

Related U.S. Application Data

(60) Provisional application No. 61/015,206, filed on Dec. 20, 2007.

(51) Int. Cl.
*B62D 51/06* (2006.01)
*B62D 1/24* (2006.01)

(52) U.S. Cl. ........... 180/167; 180/8.3; 180/8.1; 180/8.2; 180/8.5; 180/8.6; 180/8.7; 180/218; 180/9.1; 446/129; 446/133; 446/135; 446/138

(58) Field of Classification Search ............ 180/9.1, 180/8.3, 8.1, 8.2, 8.5, 8.6, 8.7, 218, 167; 446/129, 133, 135, 138
See application file for complete search history.

(56) References Cited

U.S. PATENT DOCUMENTS

| | | | |
|---|---|---|---|
| 4,669,915 A * | 6/1987 | Shatto, Jr. ................... 405/191 |
| 4,993,913 A | 2/1991 | Ohtsuki et al. |
| 5,165,347 A * | 11/1992 | Wagner ........................ 104/283 |
| 5,194,032 A * | 3/1993 | Garfinkel ...................... 446/178 |
| 5,487,440 A | 1/1996 | Seemann |
| 5,551,525 A * | 9/1996 | Pack et al. ..................... 180/8.6 |
| 5,592,998 A * | 1/1997 | Urakami ....................... 180/164 |
| 5,601,490 A * | 2/1997 | Nakagawa et al. ............. 463/63 |
| 5,839,532 A * | 11/1998 | Yoshiji et al. ................. 180/164 |
| 5,865,661 A * | 2/1999 | Cyrus et al. ................... 446/136 |
| 5,884,642 A | 3/1999 | Broadbent |
| 5,890,250 A * | 4/1999 | Lange et al. ................... 15/50.3 |
| 6,276,478 B1 | 8/2001 | Hopkins et al. |
| 6,533,281 B1 * | 3/2003 | Kumagai ...................... 273/442 |
| 6,793,026 B1 | 9/2004 | De Fazio |
| 6,840,837 B2 * | 1/2005 | Kobayashi .................... 446/136 |
| 6,986,186 B1 | 1/2006 | Dube et al. |
| 7,231,683 B1 | 6/2007 | Cruz |
| 7,235,013 B2 * | 6/2007 | Kobayashi ...................... 463/61 |
| 7,520,356 B2 * | 4/2009 | Sadegh et al. ................. 180/164 |
| 2005/0072612 A1 * | 4/2005 | Maggio ........................ 180/164 |
| 2007/0235238 A1 * | 10/2007 | Sadegh et al. ................. 180/164 |
| 2007/0289786 A1 * | 12/2007 | Cutkosky et al. ............. 180/8.6 |
| 2008/0257615 A1 * | 10/2008 | Xie et al. ....................... 180/8.7 |
| 2009/0270184 A1 * | 10/2009 | Kumagai ....................... 463/61 |

FOREIGN PATENT DOCUMENTS

| | | |
|---|---|---|
| JP | 7095936 A | 4/1995 |
| WO | WO-2007111934 | 10/2007 |

* cited by examiner

*Primary Examiner* — Paul N Dickson
*Assistant Examiner* — Marlon A Arce
(74) *Attorney, Agent, or Firm* — Blank Rome LLP

(57) ABSTRACT

A method for the locomotion of devices on opposite sides of a surface, one or more of which are mobile robots. Devices on opposing sides of the surface are coupled by an attractive force, which helps generate enough friction between said devices and the surface to allow devices to move across the surface.

33 Claims, 6 Drawing Sheets

ROBOTIC LOCOMOTION METHOD AND MOBILE ROBOT

This application claims priority to provisional application Ser. No. 61/015,206, filed Dec. 20, 2007, which is hereby incorporated by reference.

FIELD OF THE INVENTION

This invention relates to locomotion of devices on a surface, specifically to those cases where at least one device is a mobile robot. Embodiments of the present invention include attraction systems, in which a mobile robot is attracted, by electrostatic or electromagnetic force, to a mobile element on the opposite side of the surface.

In this context, a surface may be any thin, two-sided material such as a flat or rigid structure like a board, pane, panel, window, or wall; a non-flat structure like the hull of a ship, boat, plane, or terrestrial vehicle; or a non-rigid structure like a sail, tent or curtain. Importantly, the present invention allows the operation of a mobile robot on non-horizontal surfaces, on which conventional robots would have no grip. The system and method of the invention allow operating a robot on vertical or even overhanging surfaces inaccessible to conventional systems.

RELATED ART

The operation of most terrestrial robots is restricted to the ground or other surfaces where gravity provides a sufficient force for friction between the robot and the surface to allow for locomotion. However, many tasks which could potentially be addressed by robotic systems, do not meet these conditions. Our invention is specifically aimed at such tasks. For example, in order to clean a window or to inspect the hull of a ship, a robotic system must cope with the problem of moving on vertical surfaces. Several systems known in the related art have addressed this problem, but opposed to our invention, the suggested solutions are not suitable for implementation in a small inexpensive robotic device due to high energy requirements, low flexibility or other constraints detailed below.

In the same field of endeavor, U.S. Pat. No. 6,276,478 discloses a robot capable of moving against gravity and using at least one vacuum cup assembly having a port for applying a lubricant on the working surface so the cup may slide on the surface as the robot is maneuvered with the aid of powered wheels. The wheels and vacuum cut assemblies are coordinated to move on varied surfaces. The robot module may be equipped with various task-performing assemblies, and may be employed in caravans, trains, or separately in swarms.

JP7095936 discloses a method and system to reduce the running resistance of a wall surface moving robot, and improve the mobility, etc., of the wall surface moving robot by reducing the frictional resistance of a suction cup while ensuring the seal of the suction cup. On the confronting side with a wall surface of the main body of a wall surface moving robot which moves on a wall surface by driving wheels while attaching to the wall surface by a suction cup, the suction cup is provided along the outer peripheral edge of the wall surface moving robot. The suction cup is equipped with a rubber sheet with a flexibility, which is provided along the outer peripheral edge of the main body part on the confronted side with the wall surface, and an entrainment preventive plate which is provided in the arranging direction of the rubber sheet.

U.S. Pat. No. 6,793,026 discloses a wall-climbing robot or mobility platform able to ascend and descend various horizontal and vertical surfaces having a chassis, a rotor rotatable with respect to the chassis, one or more prominences on the rotor, and means for adhering to a surface attached to the prominences. The robot is able to make a transition from horizontal travel to vertical travel. In certain embodiments, the means for adhering to a wall is a pressure sensitive adhesive. In addition, multiple rotor configurations and radio-control are used for remote operation.

U.S. Pat. No. 5,884,642 discloses a remotely controlled pressurized liquid dispensing mobile unit having a pair of magnetic tracks by which the unit is attracted to and moved along a metallic body to which the pressurized liquid is dispensed.

U.S. Pat. No. 5,487,440 discloses a robot for performing a working operation on a surface. The robot comprises a frame which supports a pair of parallel tracks. An endless link chain is mounted for travel on each track and each chain is driven by an independent motor mounted on the frame. Each track is provided with at least two recesses with each recess having an open side facing the respective chain. A series of vacuum cups are mounted on each chain and are adapted to engage the surface to be traversed. A first series of ports connect a first recess of each track and a first group of vacuum cups on each chain, while a second series of ports communicate between the second recess of each track and a second group of vacuum cups. A source of vacuum is connected to the recesses and acts through the ports to the respective vacuum cups to enable the vacuum cups to grip the surface. In a preferred manner of use, the robot is employed with a laser tracking system in the non-destructive inspection of an aircraft.

U.S. Pat. No. 4,993,913 discloses a robot for a work on a wall surface comprising a main module, which is constructed of, for example, a moving scaffold, hung by ropes and being capable of moving vertically and horizontally to a desired position on a wall surface, an arm module mounted on the main module and being movable with one or more degrees of freedom with respect to the wall surface, and a wrist module mounted on the foremost end portion of the arm module, having one or more degrees of freedom necessary for the work and including an automatic tool changer for detachably mounting a tool necessary for the work on the wrist module. In one variant, fixing devices are provided on both sides of the main module and an exchangeable fixing tool is also detachably mounted on the automatic tool changer for stabilizing the main module during work and moving from one place to another.

U.S. Pat. No. 7,231,683 discloses an apparatus for cleaning a window of a structure. The window cleaning apparatus includes a guide track mounted on one side of a window frame and a second guide track mounted on a side of the window frame opposite the first guide track wherein a cleaning assembly is retained and guided between and along a length of the first and second guide tracks. The apparatus further includes a means for selectively moving the cleaning assembly along the length of the guide track and over a surface of a window within the window frame thereby cleaning the surface of the window.

WO2007111934 discloses a cleaning implement which is of the all-in-one type. It has a substrate structure that delivers impregnated cleaning liquid to the window being cleaned, a squeegee to drive used cleaning liquid off the window, and an absorbent to collect the used liquid. A single block of substrate structure can provide the applicator, scrubbing, and collecting functions, as well as filter and reprocess used cleaning liquid for further use. The substrate may be replaced separately from the squeegee, or may be replaced as a unit with the squeegee.

U.S. Pat. No. 6,986,186 discloses a window washing system for cleaning a window mounted in a dwelling wall having an inner surface and an outer surface includes a window squeegee assembly that is attached to the outer surface. The assembly includes a pair of supports that are each elongated and attached to the outer surface on either side of the window. An elongated elastomeric blade is attached to and extends between the supports. The blade has a contacting edge abutting an outer surface of the window. A driving assembly is mechanically coupled to the pair of supports for selectively moving the blade upwardly or downwardly. A liquid dispenser, fluidly coupled to a reservoir by a conduit, is provided for selectively dispensing liquid on the window.

A common problem with many related art solutions is that they rely on ad hoc support elements, like ropes, rails and scaffolds, that lead to complicated, expensive, or otherwise impractical solutions.

Another common limitation is that many current solutions rely on devices that are irremovably attached in place and can therefore only be used in a limited area.

Another recurring problem is that the known systems based on magnetic attraction are only effective on ferrous surfaces.

Another limitation of known robotic window cleaning systems is that they require large, tethered machines, windows specially equipped with guide rails, or solutions fully integrated into the window.

Further, known systems are poorly equipped to deal with vertical structures or surfaces in which both sides of the surface have to be accessed.

One aim of the present invention is thus to provide an improved method and system for ensuring the locomotion of a robotic device to surfaces oriented in any possible way with respect to the horizontal plane.

Another aim of the invention is to provide an improved method and system for moving and controlling robotic devices on surfaces.

Another aim of the invention is to provide an improved method and system for accessing opposing sides of a surface and for sharing energy and information for devices on opposing sides of a surface.

Another aim of the invention is to provide an improved method and system for cleaning windows.

Another aim of the invention is to provide an improved method and system for treating surfaces.

BRIEF SUMMARY OF THE INVENTION

According to the invention, these aims are achieved by means of a method according to claim 1. A preferred embodiment and other advantageous embodiments are indicated in the other claims and in the description.

According to one aspect, the invention also relates to an improved method and system for sharing energy and information between devices on a surface. By coupling devices on opposing sides of a surface with an attractive force and detecting changes in said force, said devices can exchange information without the need for dedicated communication hardware, or power consuming, active sensors. In addition, said force can be used to share or transfer energy between devices, for example by entraining a passive device equipped with a dynamo.

According to one aspect, the invention also relates to an improved method and system for cleaning, treating or investigating surfaces. The use of two devices coupled by an attractive force allows for small, light and agile devices that can be easily displaced from one surface to another. By using two devices on opposing sides, the invention also allows other advantages including simultaneous cleaning of both sides of a surface by equipping both devices with a cleaning mechanism, easier measurement of surface thickness by monitoring distance between both devices, or easier detection of surface contamination by monitoring absorption of light transmitted between both devices. The method may thus reduce the cost of, complexity of, and time necessary for cleaning, treating or investigating surfaces.

BRIEF DESCRIPTION OF THE DRAWINGS

The invention will be better understood with the aid of the description of an embodiment given by way of example and illustrated by the figures, in which:

FIGS. 1 to 6 show an embodiment of a robotic system operating on a glass window surface 30 according to the invention in which FIG. 1 is a perspective view of the system moving upwards on a glass window surface 30. In this implementation the system consists of two robotic devices 60, 70 equipped with front wheels with rubber tires 65, 75, and a razor blade cleaning mechanism 68, 78;

FIG. 2 is a perspective view of the system moving downwards. The two devices 60, 70 operating on opposing sides of the glass window surface 30 can be seen; omni-directional wheels 61, 71 at the back of the robots are used for stabilization and maneuverability;

FIG. 3 is a side view of the system of FIG. 2. Permanent magnets providing an attractive force between the devices 67, 77 can be seen;

FIG. 4 shows a view from the rear of an implementation of the invention operating on opposing sides of a horizontal glass window surface 30;

FIG. 5 Illustrates a variant of the invention including a mechanism to transfer energy or information 62, 72 between said devices;

FIG. 6 shows a variant of the invention including a sensor to measure external parameters 66, which may be used in the control system of the robot.

DETAILED DESCRIPTION OF PREFERRED EMBODIMENTS OF THE INVENTION

The present invention generally relates to locomotion of two or more devices 60, 70 on a surface 30, specifically to those cases where at least one device is a mobile robot. Devices on opposing sides of the surface are coupled by an attractive force, which helps generate enough friction between said devices and the surface to allow devices to move across the surface.

Figure 1:
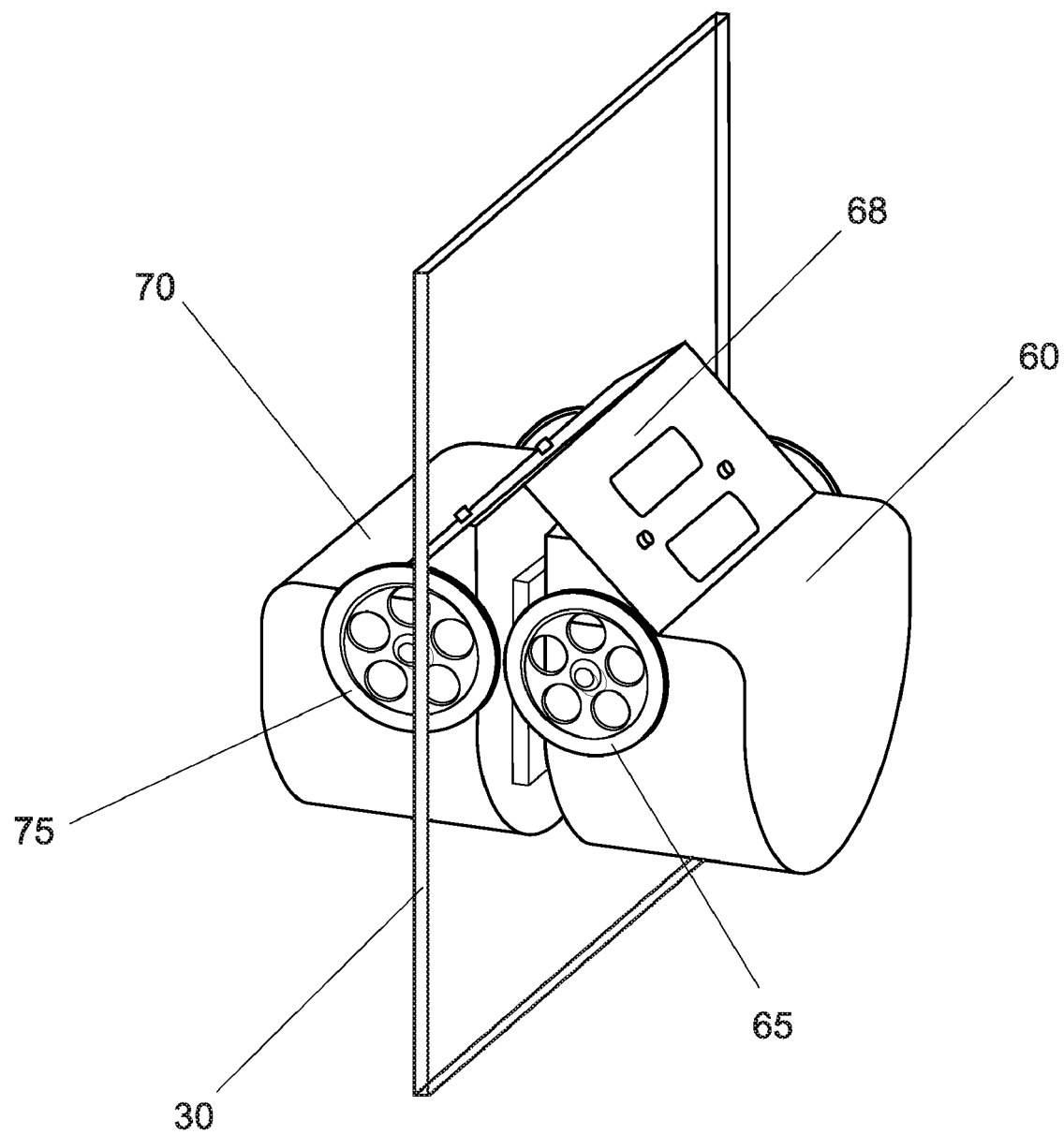
Figure 2:
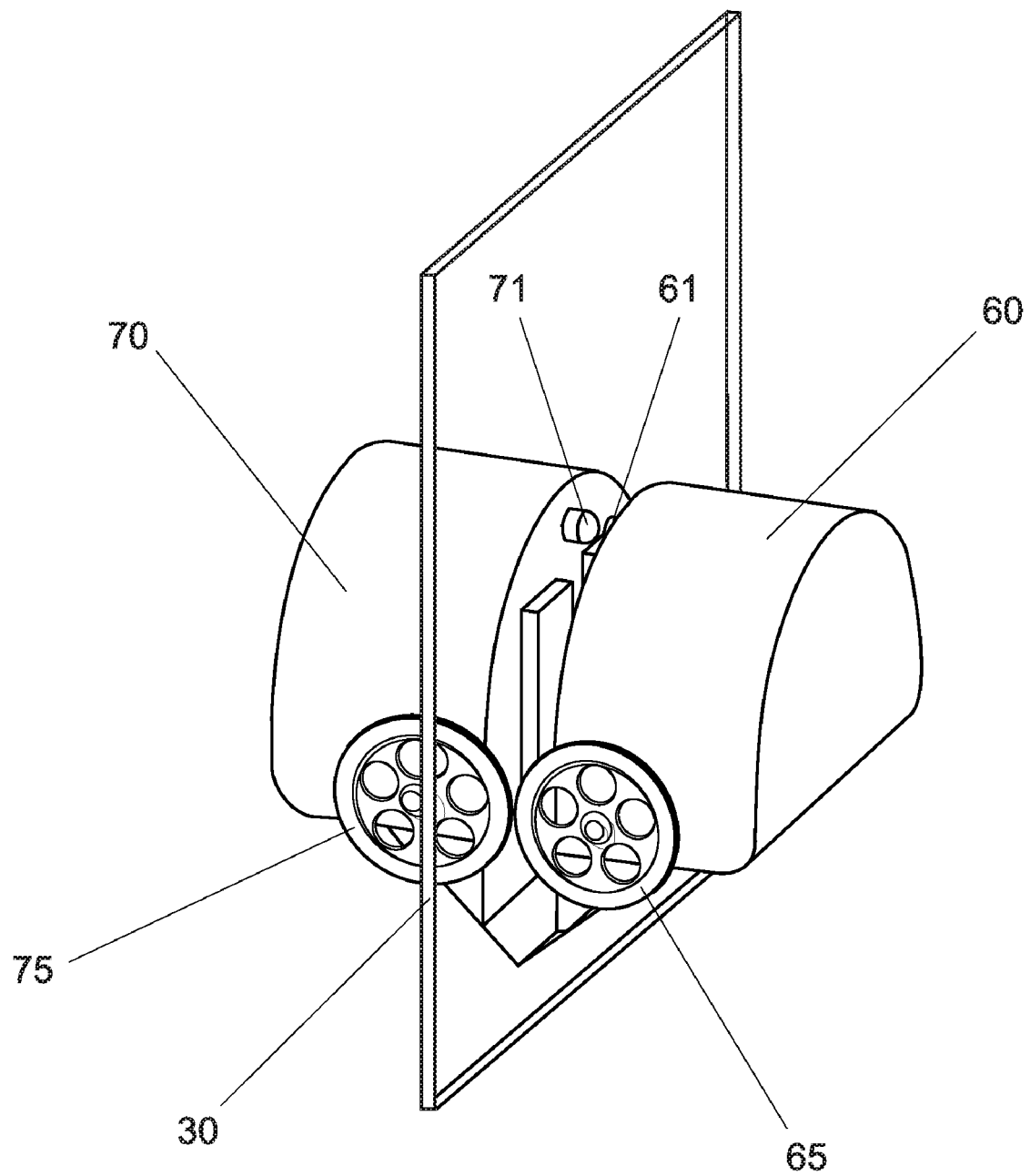
Figure 3:
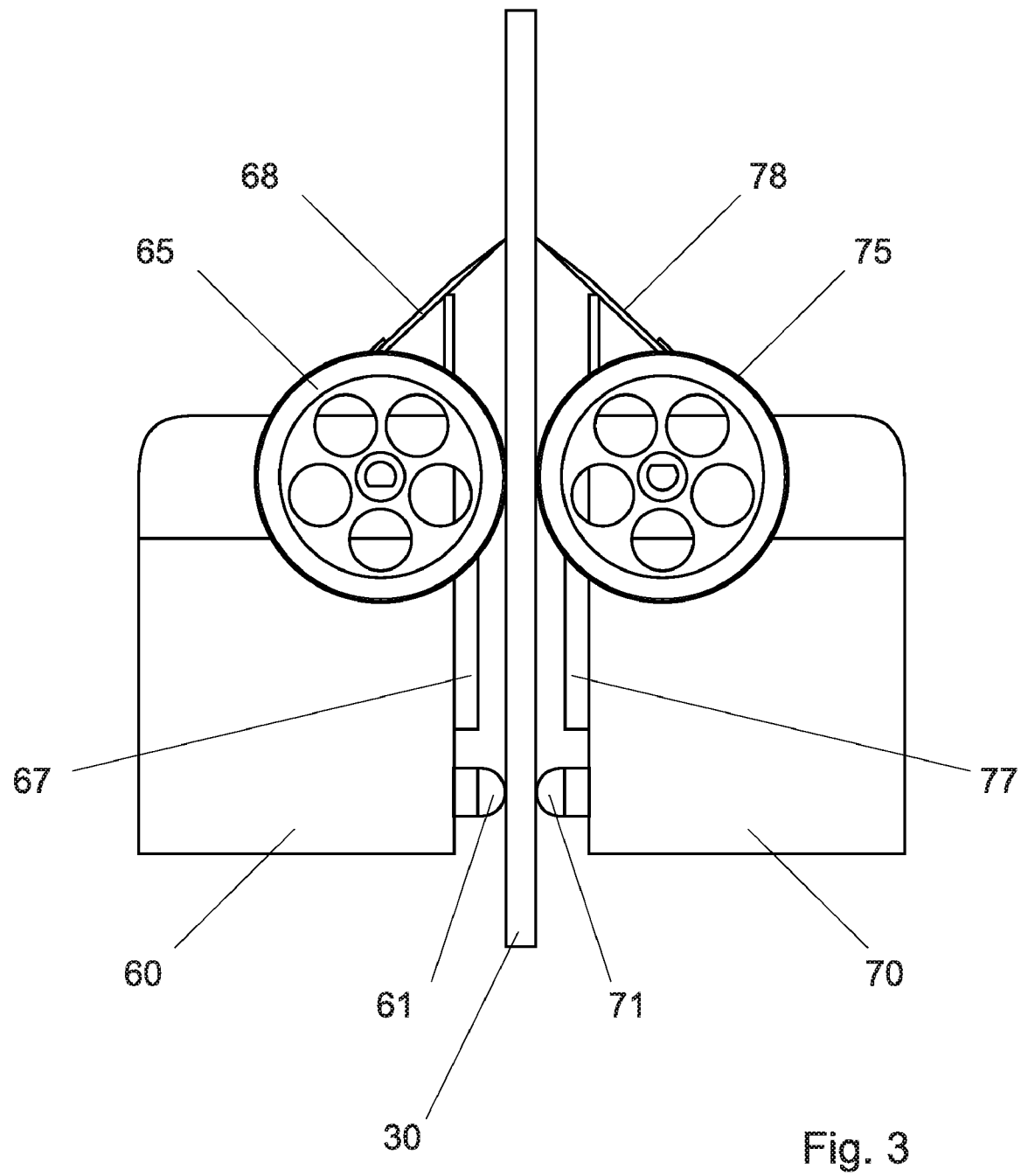
Figure 4:
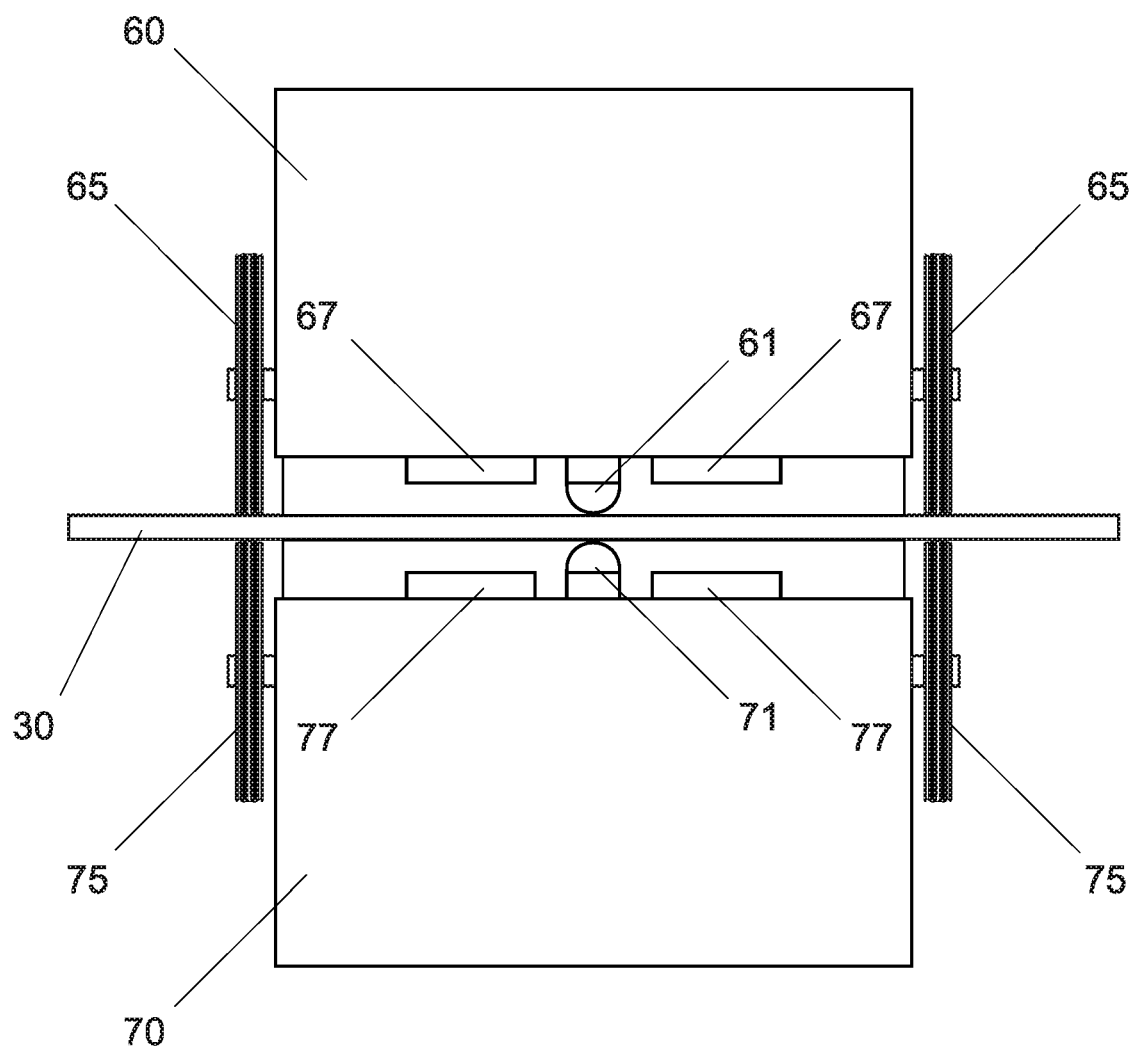
Figure 5:
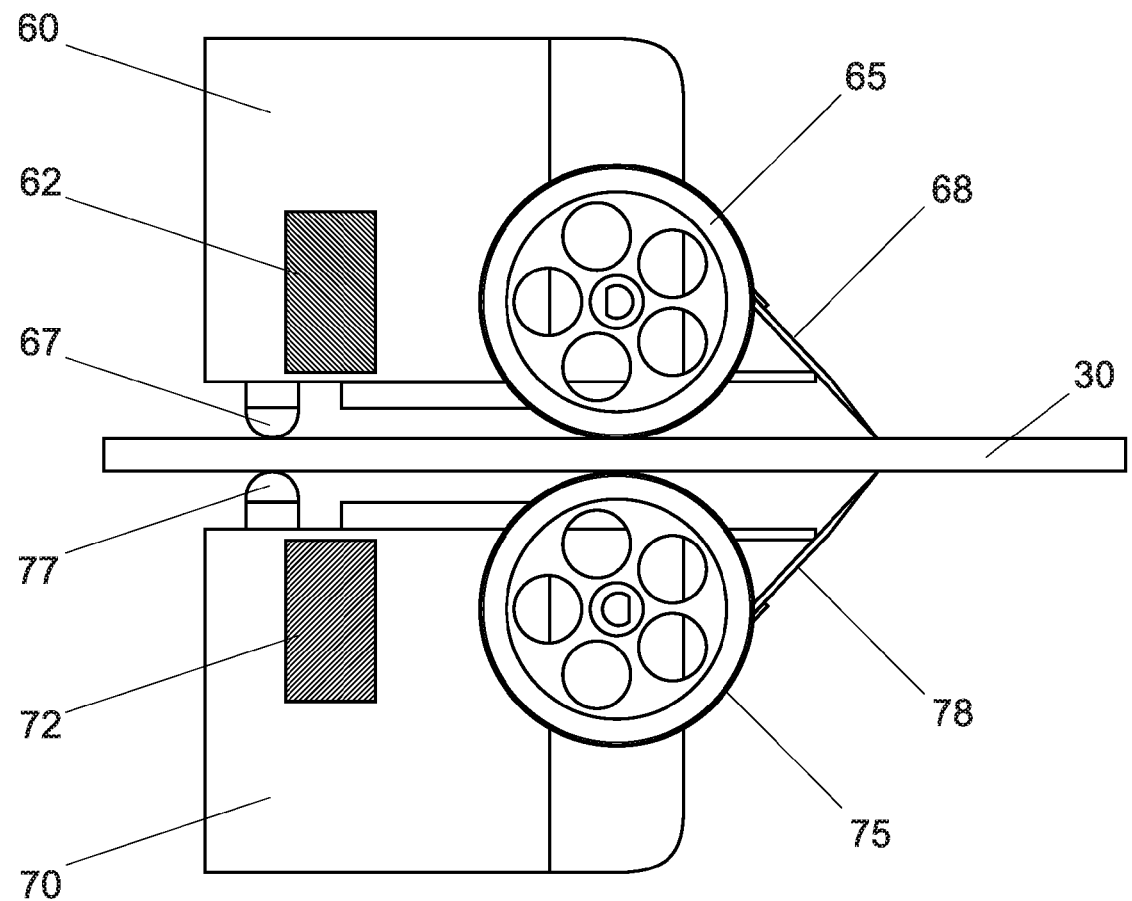
Figure 6:
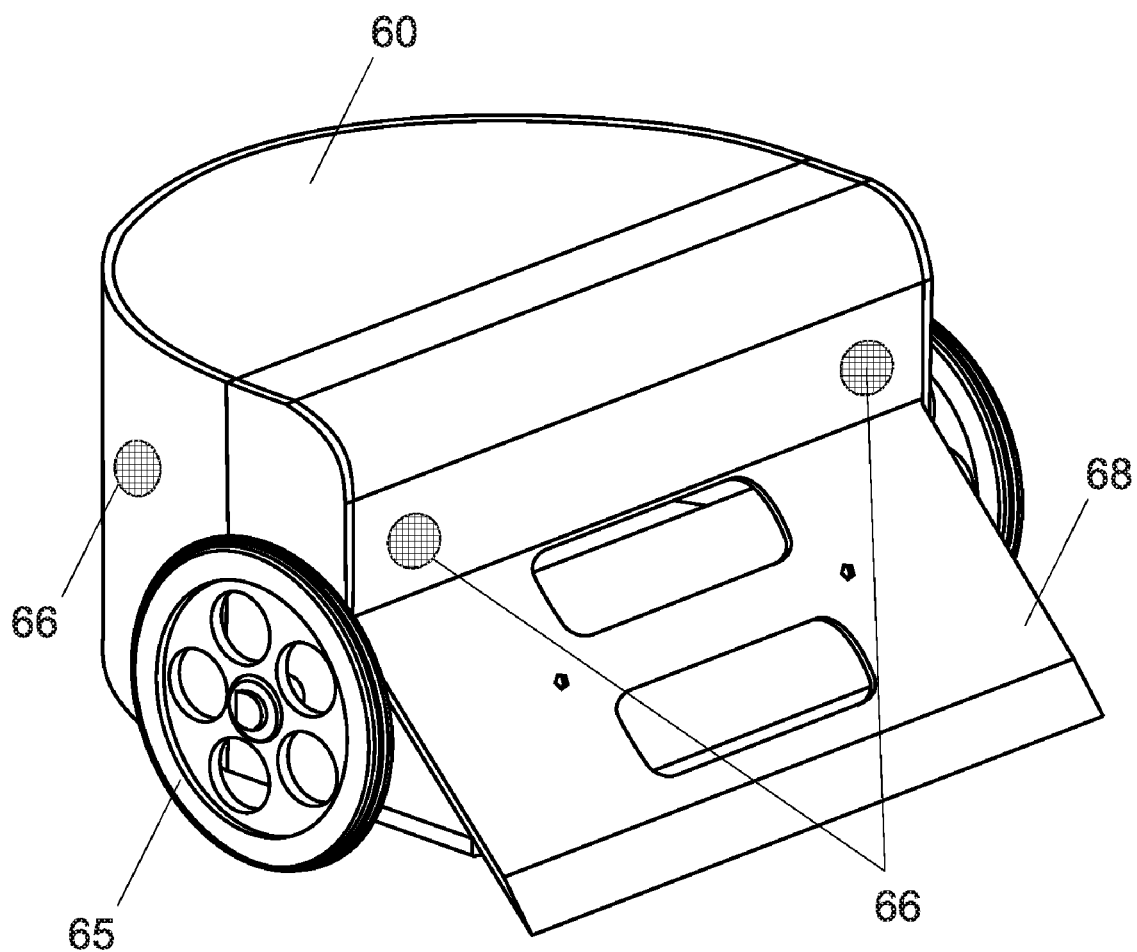

In one preferred embodiment of this invention the devices used are two autonomous robots located on opposing sides of a window glass or any other surface (FIGS. 1-6). The invention includes other embodiments, however, in which one autonomous robot is located on a first side of a surface, and a passive mobile device is located on the opposite side of the surface, and an attractive force generated by either one or the other or both devices between the devices generates friction between the devices and the surface, allowing said devices to move on the surface. Said force between the devices may also be used to move the passive device following the motion of the autonomous device.

Preferably, the force exchanged between the devices positioned on the opposite side of the surface, be they two autonomous robots or one autonomous robot and a passive device, is a range force, more preferably a force that can be exchanged without physical contact. In embodiments, permanent magnets are used to create a magnetic force between the two devices. Electromagnets may be used as an alternative. Smaller embodiments may use electrostatic forces or other forces, for example capillary forces.

Attraction: In a preferred embodiment, illustrated in FIGS. 1-4, the two robots create a force between each other by means of blocks of permanently magnetic material 67, 77. The magnets create sufficient attractive force between the robots so that the robots' rubber wheels 65, 75 do not slip on the window surface 30 as the radial force created by the magnets increases the friction between the wheels and the window surface. To obtain an optimal amount of friction between the wheels and the surface, the magnetic force between the two robots may be varied by adjusting the distance between the magnets. In a preferred embodiment this can be obtained by a simple, manually or automatically adjustable spacer mechanism. If appropriate, one of the permanent magnets 67, 77 might be replaced by a magnetic element, for example an element of soft iron, or any other suitable alloy or compound with ferromagnetic properties.

Movement: In this implementation each robot is equipped with two rubber-rimmed wheels 65, 75 pressed against the surface 30 by the magnetic force. Robots can move on the surface using electric motors attached to the wheels, or by using gravity rather than motor power, or by being entrained by the robot on the opposing side of the surface via the magnetic force between the two robots. In the case in which gravity is used, the robots are preferably positioned in the highest part of the surface, and are programmed so as to follow a downhill path on the surface. The robot could be steered, for example, by applying differential driving or braking to the wheels 65, 67, or in any other appropriate way.

Energy: In this implementation one or both robots are powered by rechargeable batteries. Energy may also be stored as gravitational energy (e.g., by parking the robots at the top of the window). Solar cells located on the robot are used to recharge the batteries or capacitors. While simple detachment and reattachment is possible, in this implementation robots are designed for long-term energy autonomy and prolonged use on a single window. The magnetic force also allows robots to share energy. For example, under certain conditions robots can drive at a speed proportional to their battery charge. The more highly charged, faster robot will then entrain the less charged, slower robot via the attractive force, thus reducing the energy drain on the less charged, slower robot and equalizing both robots' battery levels over time. Under different conditions, one of which may be that the battery charge of a robot drops below a certain threshold, the robot may remain entirely passive and move only by entrainment. In this case the robot's electric motor may generate electricity which can be used to recharge the robot's batteries.

Control and sensing: Preferably both robots are controlled by micro-processors. Robots may use information including the direction of gravity, odometry, as well as the frequency and the direction of their encounters with obstacles to determine parameters for the control program of the robot. For example, robots may determine the likely window dimensions by using their odometric readings to measure the maximum distances horizontal and vertical to the direction of gravity without encountering obstacles. Robots preferably use information including temperature, humidity, intensity and duration of light on both sides of the surface to determine parameters for the control program of the robot. For example, robots may determine the optimal location for recharging their batteries using solar panels by monitoring and remembering light intensity across different locations on the window. In a preferred variant both robots are equipped with infrared emitters and infrared sensors that allow the robots to determine the degree of surface contamination by detecting the absorption of light traversing the window. This allows robots, for example, to adapt their cleaning speed and thoroughness, and to concentrate their cleaning efforts on the most contaminated locations.

Communication: Robots are preferably equipped with an electronic anti-theft system which will only allow a robot to function in the presence of a second robot matching its (e.g., RFID) signature. For example, the robots will periodically read the other robot's passive RFID tag and if it is absent or does not match the preprogrammed signature they will set a flag in the control program and cease functioning. The robots also periodically monitor the attractive force linking each other. If the robot or its protective cover is moved the robots will sense a disturbance in the force. A disturbance large enough to indicate removal of either robot or a robot cover will set off an audio alarm, providing a simple protection against tampering. Preferably robots can also communicate parameters of the control strategy or other signals in order to synchronize the cleaning behaviour. For example, both robots may move at a speed depending on their battery charge, allowing the robots to communicate their respective battery charges via a disturbance in the force. As another example, both robots may use small permanent magnets mounted on the wheels to detect each other's wheel movements, effectively comparing their respective odometric readings. This is used to detect slippage on the window surface and, if the amount of slippage exceeds a certain threshold, the robot control system directs the robots to climb the surface at an angle.

Cleaning: In the illustrated embodiment implementation either one or both robots are equipped with a window cleaning tool, consisting of several razor blades which may be made of various materials and mounted under the robot in contact with the glass window. Razor blades are preferably operated by piezoelectric actuators to aid the cleaning process with vibrations. Depending on sensor readings, such as those for temperature, barometric pressure or humidity, some types of razor blades may also be cooled and heated to create water condensation to aid the cleaning process. Other cleaning devices, like squeegees brushes or spray devices might also be used.

Surface treatment: According to another embodiment, either one or both robots are equipped for carrying out a surface treatment on the surface on which they move. Many surface treatments are possible and included in the scope of the present invention. In a variant, either one or both robots are equipped with a polishing pad in their underbodies that can be used to polish the underlying surface. The polishing action can be achieved by a dedicated actuator, for example a motor that drives the polishing pad in rotation, or by the locomotion of the robot themselves. In other variants, the robots can be equipped with a painting device, for depositing a film of paint or other substance on the surface. In a further variant, either one or both robots are equipped with a device leaving a visible mark on the surface on which they move, for example a felt-tip pen or a chalk, and are programmed to draw or write on the underlying surface.

Device body: In the illustrated embodiment both robots have a cover to protect them from adverse conditions, such as rain or dust, as well as from tampering. Preferably, to prevent disconnection of the two robots by pulling one robot away from the glass window, resulting in the fall of the second robot, the covers easily detach from the rest of the robot, with the robot attachment mechanism remaining in place. A warning message explaining the correct procedure for removing both robots is printed under the cover.

DETAILED DESCRIPTION OF ALTERNATIVE EMBODIMENTS OF THE INVENTION

The following sections are concerned with variations of the implementation described above. Variations may concern a single aspect or combinations of various aspects of the above-mentioned implementation. Variations may be applied individually or in combination to give rise to a large number of possible alternative embodiments.

Apparatus

The complete apparatus may consist of a single or multiple autonomous or remotely controlled mobile robots or other active or passive devices or a combination thereof. As detailed in the descriptions below, devices may be adapted depending on desired function, surface properties, the size of the embodiment, or other requirements.

Attraction

Attraction between the two devices may be accomplished using various means depending on the desired function, surface properties and the size of the embodiment. The attractive force may be generated by a mechanism part of one or multiple devices, such as a single permanent magnet on a device, or it may make use of properties of the surface, such as small holes. For example, the attractive forces may be generated by magnets including permanent magnets, non-permanent magnets (electromagnets), magnetic materials or other generators of electromagnetic fields generated by one or multiple devices. In particular in smaller embodiments, forces used may also include electrostatic or capillary forces. Depending on the orientation of the surface and that of the devices, the latter may be held in place either by the friction between the devices and the surface generated by the attractive force and possibly other applicable forces like gravity, or solely by the attractive force, for example on a glass ceiling, or by a combination of these forces. The strength of the attractive and friction forces may be varied by various means again depending on desired function, surface properties or the size of the embodiment. For example, the effective strength of an attractive magnetic force may be changed by changing the angle, distance or alignment between the generators of the forces, or by changing the strength of the electromagnetic forces on one or both sides of the surface. Similarly, and again depending on the desired function, surface properties and the size of the embodiment, the friction forces between the devices and the surface as a result of the attractive force acting together with other forces may be modified by various means, including angle, distance or alignment as well as a choice of appropriate materials at the contact surfaces.

Movement

Devices may move actively by using their own actuator(s), gravity, or other applicable forces. For example, in a possible embodiment a device inspecting the hull of moving ship may employ angled blades in combination with water moving past the hull to ascend or descend. Devices may also move passively, for example by being entrained by another device on the opposing side of the surface via attractive forces. Devices may be equipped with various means for locomotion, including wheels, legs, tracks, treels or whegs.

Energy Sources

Devices may be powered using various forms of energy, including chemical energy (e.g., gained from batteries or organic processes), electromagnetic energy (e.g., gained via solar panels or other devices based on the photoelectric effect), thermal energy (e.g., gained via air temperature gradients or temperature gradients in a reservoir on a device), potential energy (e.g., gained from transforming gravitational potential energy or springs), or electrical energy (e.g., gained from electrostatic buildup). For example, in a possible embodiment a device inspecting the hull of moving ship may channel water moving past the hull into its interior to power a turbine. Importantly, devices may also share energy using various methods, including entraining, for example in combination with a dynamo, electromagnetic radiation, for example using induction, or mechanically, for example using vibrations. Devices may also be charged by an external energy source (e.g., a charging station located in a corner of the surface one of the devices is operating on), remotely, or manually (e.g., via a plugged cable or by changing the battery).

Control And Sensing

One or more devices and their movement, battery charging cycle, cleaning tools, or attachment forces among others may be controlled by analogue or digital electronic or mechanical control systems. Control programs may include a variety of state-of-the-art robotic control techniques such as Simultaneous Localization And Mapping (SLAM), behavior based robotics, subsumption architectures, neural control or other artificial intelligence. Devices may rely on a variety of sensory information, such as that gained from odometry, accelerometers, gyroscopes, bumpers, temperature sensors, chemical sensors, electromagnetic sensors, sensors for surface contamination or sensors of the cleaning tool among others. Devices may also rely on a variety of other information, such as memory, user preferences, typical window geometries, the location of charging stations, geographic location, date, or time of day. The control method used may be adaptively changed based on sensory information and other information described above. In addition to the control and sensing systems available on board a device, devices may also use control and sensing systems on other devices or rely on external information, for example those available from a fixed control or sensing station. Devices may be remote controlled by a user or based on other externally generated sensor inputs.

Communication

Devices may communicate between themselves or with an external controller using wireless communication, including infrared and Bluetooth™, as well as communication through the surface material, including electromagnetic, mechanic or acoustic signals. The communicated signals may include sensory information such as still or video images, temperature or humidity measurements. Signals may be transmitted to a base station for example for monitoring of the environmental conditions or surveillance. Vice versa, devices may receive signals from a base station, for example the current time or a radio program. One or more devices may be equipped with a theft protection, which may for example be activated when the devices are separated or if the hull of one of the devices is removed. Theft protection may trigger an optical or acoustical alarm signal or communicate a warning message using wireless communication.

Cleaning Method

Devices may or may not include a variety of cleaning methods based on mechanical or chemical cleaning techniques, or a combination thereof. Cleaning methods may include dry or wet cleaning and may or may not make use of expendable material such as cleaning fluids or cleaning tissues. Examples include razor blades, dry or moist tissues or fabrics, rotating or vibrating brushes, various cleaning agents including water, steam, alcohol or detergents, ultra-sound, pressurized air, heat, electromagnetic forces and radiation, or combinations thereof, in a variety of spatial arrangements.

The parameters of the various cleaning methods may be varied (e.g., changing the positions or angles of mechanical parts). The cleaning method may be specific to the surface properties and different methods may be used on opposing sides of the surface, including the case where only one side of the surface is cleaned. Devices may be equipped with a specific cleaning tool to clean hard-to-reach places such as corners or edges. If necessary, expendable materials like cleaning fluids, tissues or other can be replaced at a charging station (e.g., located in a corner of the working surface) or manually.

Device Body

The device body may feature a removable cover. Such a cover may serve various functions, including protection from contamination with water, dirt or other harm, provide advertising space, prevent accidental detachment of devices by removal of a device, provide energy for example by electromagnetic radiation, contain sensors for example for electromagnetic radiation, temperature or dirt, serve as a thematic or artistic element for example by displaying images on an integrated LCD screen, by reflecting light, by displaying images from a camera or by mirroring part of its surroundings. In one possible implementation the device body or parts thereof are transparent, making it less visible on the surface. In one possible implementation the device body or parts thereof serve to block electromagnetic radiation, including sunlight.

Applications

Electromagnetically attached devices equipped with a cleaning mechanism may be used for a number of applications, including the following:

- Devices may be used to clean one or both sides of flat surfaces.
- Devices may be used to clean one or both sides of curved surfaces such as the hull of a ship, including cleaning while the ship is in motion, in which case energy may be extracted from water moving past or through the device.
- Devices may form communicating sensor networks.
- Devices may be used to display advertisements or information, such as information on the current weather, using various methods, including displays (e.g., LCD) on the devices or use of the position and orientation of the devices on the surface.
- Devices may be used as toys, for example as moving targets for a laser tag game.
- Devices may be used to create patterns for artistic or other purposes, either on the surface or by projection.
- Devices may be used for artistic reasons, including Christmas decoration or display of light patterns.
- Devices may be used to attract the attention of by-passers including advertising for items of interest or those items in the vicinity.
- Devices may be used to interact with people, including interaction through sensing of movement, obstacles, touch as well as audio or visual communication, and may be used for entertainment, offer help, or direct people's attention.
- Devices may be used to test the material properties of surfaces for example for quality control or inspection.
- Devices may be used to treat surfaces.
- Devices may be used to provide protection from electromagnetic radiation, for example by selectively blocking sunlight when used on a transparent surface such as a window.

The invention claimed is:

1. A mobile robotic system for locomotion on a two-sided surface including:

a robotic mobile device, said device having a locomotion means for locomotion on the surface and a first attraction means;

a second mobile device having a second attraction means;

wherein the first attraction means of the robotic mobile device and the second attraction means of the second mobile device are so arranged as to generate an attractive force between the robotic mobile device and the second mobile device when the robotic device and the second mobile device are in a facing relationship on the opposite sides of the surface, wherein said attractive force generates an opposite reaction force of the surface to the locomotion means, thereby providing friction for the locomotion of the robotic mobile device;

the system further comprising one of attractive force sensor, gravity sensor, friction force sensor, obstacle sensor, temperature sensor, barometric sensor, humidity sensor, surface contamination sensor, light intensity sensor or light polarization sensor, battery level sensor, wherein the behavior of the robotic system depends on the sensor output.

2. The mobile robotic system according to claim 1, wherein the robotic mobile device and the second mobile device are arranged to keep the facing relationship during the locomotion.

3. The mobile robotic system according to claim 1, wherein the second mobile device is a second robotic mobile device operatively arranged to follow the motion of the first robotic mobile device and keep the facing relationship of the first robotic mobile device and the second robotic mobile device during locomotion.

4. The mobile robotic system of claim 1, wherein the second mobile device is a passive device, entrained by the attractive force between the robotic mobile device and second mobile device and operatively arranged to follow the motion of the robotic mobile device and keep the facing relationship of the robotic mobile device and second mobile device during locomotion.

5. The mobile robotic system of claim 1, comprising sensors to determine the value of an external or internal quantity on both sides of the surface, wherein the programmed behavior of the robotic system is a function of sensors' outputs.

6. The mobile robotic system of claim 1, comprising a data transmission interface allowing the exchange of information between the robotic mobile device on one side of the surface and the second mobile device on the opposite side of the surface.

7. The mobile robotic system of claim 1, further including means for delivering a surface treatment to the surface, or for cleaning the surface, for example a blade, a squeegee, a brush, or a polishing pad.

8. The mobile robotic system of claim 7, comprising means for delivering a surface treatment to both sides of the surface, or for cleaning both sides of the surface.

9. The mobile robotic system of claim 1, equipped with a mechanical or electronic anti-theft, anti-tampering, guarding or surveillance system.

10. The mobile robotic system of claim 1, said attractive force being a contactless range force, in particular a magnetic or electrostatic or electromagnetic force.

11. The mobile robotic system of claim 1, wherein manipulation of said attractive force is used to transfer energy or information between said devices.

12. The mobile robotic system of claim 1, wherein at least one of said devices makes use of potential gravitational energy by positioning itself on the surface.

13. A mobile robotic method for locomotion on a two-sided surface including:
- providing a robotic mobile device, said device having a locomotion means for locomotion on the surface and a first attraction means;
- providing a second mobile device having a second attraction means;
- wherein the first attraction means of the robotic mobile device and the second attraction means of the second mobile device are so arranged as to generate an attractive force between the robotic mobile device and the second mobile device when the robotic device and the second mobile device are in a facing relationship on the opposite sides of the surface, wherein said attractive force generates an opposite reaction force of the surface to the locomotion means, thereby providing friction for the locomotion of the robotic mobile device;
- providing one of attractive force sensor, gravity sensor, friction force sensor, obstacle sensor, temperature sensor, barometric sensor, humidity sensor, surface contamination sensor, light intensity sensor or light polarization sensor, battery level sensor, wherein the behavior of the robotic system depends on the sensor output.

14. The mobile robotic method according to claim 13, wherein the robotic mobile device and the second mobile device are arranged to keep the facing relationship during the locomotion.

15. The mobile robotic method according to claim 1, wherein the second mobile device is a second robotic mobile device operatively arranged to follow the motion of the first robotic mobile device and keep the facing relationship of the first robotic mobile device and the second robotic mobile device during locomotion.

16. The mobile robotic method of claim 13, wherein the second mobile device is a passive device, entrained by the attractive force between the robotic mobile device and second mobile device and operatively arranged to follow the motion of the robotic mobile device and keep the facing relationship of the robotic mobile device and second mobile device during locomotion.

17. The mobile robotic method of claim 13, further comprising a sensor to determine the value of an external or internal quantity, wherein the programmed behavior of the robotic method is dependent on the sensor output.

18. The mobile robotic method of claim 17, wherein the sensor is one of attractive force sensor, gravity sensor, friction force sensor, obstacle sensor, temperature sensor, barometric sensor, humidity sensor, surface property sensor, light intensity sensor or light polarization sensor, battery level sensor.

19. The mobile robotic method of claim 17, comprising sensors to determine the value of an external or internal quantity on both sides of the surface, wherein the programmed behavior of the robotic method is a function of sensors' outputs.

20. The mobile robotic method of claim 13, comprising a data transmission interface allowing the exchange of information between the robotic mobile device on one side of the surface and the second mobile device on the opposite side of the surface.

21. The mobile robotic method of claim 13, further including means for delivering a surface treatment to the surface, or for cleaning the surface, for example a blade, a squeegee, a brush, or a polishing pad.

22. The mobile robotic method of claim 21, comprising means for delivering a surface treatment to both sides of the surface, or for cleaning both sides of the surface.

23. The mobile robotic method of claim 13, equipped with a mechanical or electronic anti-theft, anti-tampering, guarding or surveillance method.

24. The mobile robotic method of claim 13, said attractive force being a contactless range force, in particular a magnetic or electrostatic or electromagnetic force.

25. The mobile robotic method of claim 13, wherein manipulation of said attractive force is used to transfer energy or information between said devices.

26. The mobile robotic method of claim 13, wherein at least one of said devices makes use of potential gravitational energy by positioning itself on the surface.

27. The mobile robotic system of claim 1,
wherein the robotic mobile device is arranged to be steered.

28. A mobile robotic system for locomotion on a two-sided surface including:
- a robotic mobile device, said device having a locomotion means for locomotion on the surface and a first attraction means;
- a second mobile device having a second attraction means;
- wherein the first attraction means of the robotic mobile device and the second attraction means of the second mobile device are so arranged as to generate an attractive force between the robotic mobile device and the second mobile device when the robotic device and the second mobile device are in a facing relationship on the opposite sides of the surface, wherein said attractive force generates an opposite reaction force of the surface to the locomotion means, thereby providing friction for the locomotion of the robotic mobile device, and
- a data transmission interface allowing the exchange of information between the robotic mobile device on one side of the surface and the second mobile device on the opposite side of the surface.

29. A mobile robotic system for locomotion on a two-sided surface including:
- a robotic mobile device, said device having a locomotion means for locomotion on the surface and a first attraction means;
- a second mobile device having a second attraction means;
- wherein the first attraction means of the robotic mobile device and the second attraction means of the second mobile device are so arranged as to generate an attractive force between the robotic mobile device and the second mobile device when the robotic device and the second mobile device are in a facing relationship on the opposite sides of the surface, wherein said attractive force generates an opposite reaction force of the surface to the locomotion means, thereby providing friction for the locomotion of the robotic mobile device, and
- means for delivering a surface treatment to the surface, or for cleaning the surface, for example a blade, a squeegee, a brush, or a polishing pad.

30. A mobile robotic method for locomotion on a two-sided surface including:
- providing a robotic mobile device, said device having a locomotion means for locomotion on the surface and a first attraction means;
- providing a second mobile device having a second attraction means;
- wherein the first attraction means of the robotic mobile device and the second attraction means of the second mobile device are so arranged as to generate an attractive force between the robotic mobile device and the second mobile device when the robotic device and the second mobile device are in a facing relationship on the opposite sides of the surface, wherein said attractive force generates an opposite reaction force of the surface to the locomotion means, thereby providing friction for the locomotion of the robotic mobile device; and, providing a data transmission interface allowing the exchange of information between the robotic mobile device on one side of the surface and the second mobile device on the opposite side of the surface.

31. The robotic method of claim 30, wherein the two-sided surface comprises a vertical or overhanging surface, and further comprising locating the robotic mobile device and the second mobile device on opposing sides of a two-sided vertical or overhanging surface.

32. A mobile robotic method for locomotion on a two-sided surface including:
providing a robotic mobile device, said device having a locomotion means for locomotion on the surface and a first attraction means;
providing a second mobile device having a second attraction means;
wherein the first attraction means of the robotic mobile device and the second attraction means of the second mobile device are so arranged as to generate an attractive force between the robotic mobile device and the second mobile device when the robotic device and the second mobile device are in a facing relationship on the opposite sides of the surface, wherein said attractive force generates an opposite reaction force of the surface to the locomotion means, thereby providing friction for the locomotion of the robotic mobile device; and
providing means for delivering a surface treatment to the surface, or for cleaning the surface, for example a blade, a squeegee, a brush, or a polishing pad.

33. The method of claim 32, wherein the two-sided surface comprises a vertical or overhanging surface, and further comprising locating the robotic mobile device and the second mobile device on opposing sides of the vertical or overhanging surface.

* * * * *